United States Patent

Nemoto et al.

[11] Patent Number: 5,923,661
[45] Date of Patent: Jul. 13, 1999

[54] METHOD OF COLLECTING LARGE AMOUNTS OF DATA IN APPARATUS SUCH AS ATM EXCHANGE

[75] Inventors: Emi Nemoto, Inagi; Sumie Morita, Kawasaki; Hiroyuki Sasai; Miho Tsuchiya, both of Yokohama, all of Japan

[73] Assignee: Fujitsu Limited, Kanagawa, Japan

[21] Appl. No.: 08/819,732

[22] Filed: Mar. 18, 1997

[30] Foreign Application Priority Data

Mar. 19, 1996 [JP] Japan ...................................... 8-062665

[51] Int. Cl.⁶ ............................. H04L 12/28; H04L 12/56
[52] U.S. Cl. ............................................ 370/426; 370/449
[58] Field of Search ..................... 370/395, 397, 370/399, 398, 412, 422, 426, 428, 429, 449, 346; 340/825.08; 371/32, 33

[56] References Cited

U.S. PATENT DOCUMENTS 5,648,963  7/1997  Miyaki et al. ........................... 370/218
5,675,587  10/1997  Okuyama et al. ...................... 371/20.1
5,694,554  12/1997  Kawabata et al. ....................... 395/250

*Primary Examiner*—Ajit Patel
*Attorney, Agent, or Firm*—Helfgott & Karas, PC.

[57] ABSTRACT

A central control unit responsible for path control collects data from a distribution/concentration unit by issuing thereto a command containing the specification of multiple data items. The command also contains the specification of a window size. Of the requested data, the distribution/concentration unit first transmits data in an amount not exceeding the window size, and then, after reception of an ACK order from the central control unit, transmits remaining data if any.

8 Claims, 19 Drawing Sheets

Fig. 6

INQUIRY ORDER (CC → COMMON PART)

| 0 | 7 | 15 | 23 | 31 |
|---|---|---|---|---|
| FUNCTION INFORMATION || — ||
| EVENT | — | WS VALUE | — ||

Fig.7

INQUIRY ORDER RESPONSE (COMMON PART → CC)

| 0 | 7 | 15 | 23 | 31 |
|---|---|---|---|---|
| \multicolumn{5}{c|}{FUNCTION INFORMATION} |

| EVENT | STATUS NUMBER | WS VALUE | — |
| CAUSE CODE | NUMBER OF TRANSMITTED SHW | TOTAL NUMBER OF MESSAGES | |
| COMMON PART SEQUENCE NO. | NUMBER OF MESSAGES | | |
| NUMBER OF INSTANCES | | | |
| ⋮ | | | |
| COMMON PART SEQUENCE NO. | NUMBER OF MESSAGES | | |
| NUMBER OF INSTANCES | | | |

Fig.8

AUTONOMOUS STATUS (COMMON PART → CC)

| 0 — 7 | 8 — 15 | 16 — 23 | 24 — 31 |
|---|---|---|---|
| FUNCTION INFORMATION || — ||
| EVENT | STATUS NUMBER | — | — |
| — ||||
| — | COMMON PART SEQUENCE NO. | INDIVIDUAL PART SEQUENCE NO. ||

Fig.9

ACK ORDER (CC → COMMON PART)

| 0 — 7 | 8 — 15 | 16 — 23 | 24 — 31 |
|---|---|---|---|
| FUNCTION INFORMATION || — ||
| EVENT | STATUS NUMBER | WS VALUE | — |
| — | — | — ||
| — | COMMON PART SEQUENCE NO. | INDIVIDUAL PART SEQUENCE NO. ||

Fig.10

ACK ORDER RESPONSE (COMMON PART → CC)

| 0 | 7 | 15 | 23 | 31 |
|---|---|---|---|---|
| FUNCTION INFORMATION | | | | |
| EVENT | STATUS NUMBER | WS VALUE | | |
| CAUSE CODE | NUMBER OF REPORTED MESSAGES | NUMBER OF REPORTED INSTANCES | | |
| — | COMMON PART SEQUENCE NO. | INDIVIDUAL PART SEQUENCE NO. | | |

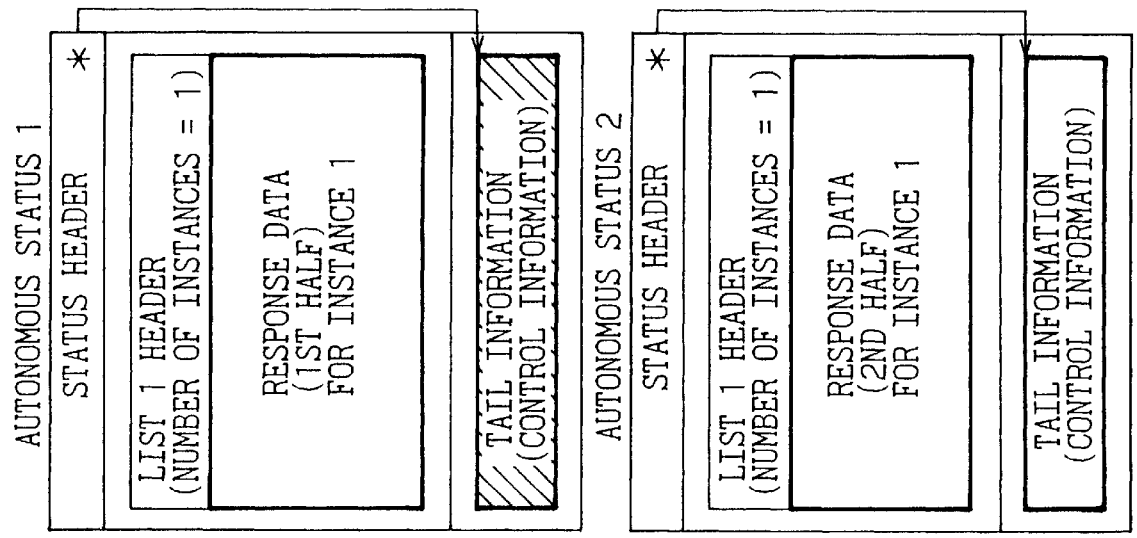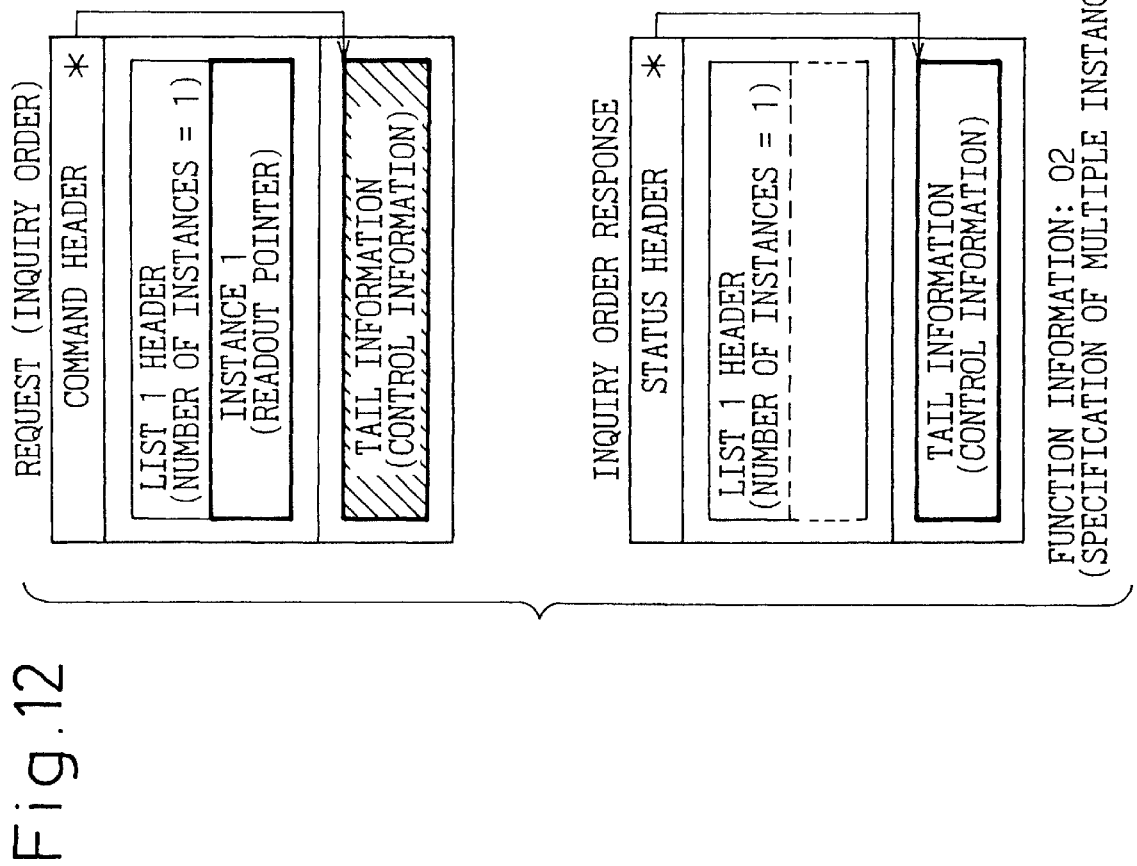
Fig.12

METHOD OF COLLECTING LARGE AMOUNTS OF DATA IN APPARATUS SUCH AS ATM EXCHANGE

BACKGROUND OF THE INVENTION

1. Field of the Invention

The present invention relates to a method by which a central control unit of an ATM exchange or the like collects large amounts of data from other units, for example, when the central control unit collects billing information, path monitoring (PM) information, and other data from a plurality of distribution/concentration units for each of a large number of setup paths.

2. Description of the Related Art

An ATM (Asynchionous Transfer Mode) exchange includes a plurality of concentration/distribution units, each connected to a plurality of line interface units, for performing cell multiplexing and demultiplexing, and an ATM switch, connected to the plurality of concentration/distribution units, for performing cell switching. The ATM switch is connected to a central control unit (CC) which performs path setup/release control via a DMA (Direct Memory Access) line. The CC collects data such as billing information, the number of passed cells, the number of discarded cells, etc. for each setup path from the distribution/concentration units (hereinafter called the common parts) via the same DMA line. The CC also collects performance monitoring (PM) data, obtained at each line interface unit (hereinafter called the individual part), from its associated common part by DMA communication.

In the prior art, the CC issues an independent command to each individual part, and in response to that, each individual part returns a response status independently of the others. Furthermore, within each individual part, there are a plurality of points or items to be monitored; when the CC makes a data collection request to the individual part, the CC issues a different command for each of such points or items and receives a response status for each of the points or items.

Therefore, the amount of command/status data transferred between the CC and the common parts, and hence the amount of communication between them, becomes enormous, and congestion may result. Since this can cause a detrimental effect on other control functions (such as path control) that require realtime processing, some form of control must be implemented.

To address this problem, the prior art employs a method in which commands associated with data collection functions are given lower priority than other control functions (such as path control), but this method is not intended to reduce the absolute amount of the data transferred in connection with data collection functions. The reality is that no study has been made in the prior art on methods for substantially reducing the amount of communication.

SUMMARY OF THE INVENTION

It is accordingly an object of the present invention to prevent the amount of communication from becoming enormous when collecting large amounts of data.

According to the present invention, in a cell switching apparatus comprising a plurality of concentration/distribution units, each connected to a plurality of line interface units, for performing cell multiplexing and demultiplexing, a cell switch, connected to the plurality of concentration/distribution units, for performing cell switching, and a central control unit, connected to the cell switch, for performing path control, there is provided a method by which the central control unit collects, from each concentration/distribution unit, data concerning paths set up within the cell switching apparatus, comprising the steps of: issuing a command, containing specification of multiple data items, from the central control unit to the concentration/distribution unit; and transmitting data of the specified data items to the central control unit in response to the command.

According to the present invention, there is also provided a method by which a first apparatus unit collects data from a second apparatus unit, comprising the steps of: Transmitting from the first apparatus unit to the second apparatus unit a command containing specification of multiple data items and including a first window size indicating the amount of data that the first apparatus unit is able to accept at a time; transmitting data of the specified data item in an amount not exceeding the first window size to the first apparatus unit in response to the command; transmitting an acknowledge order with the first window size included therein from the first apparatus unit to the second apparatus unit if there remains data yet to be transmitted from the second apparatus unit to the first apparatus unit; and transmitting data of the specified data items in an amount not exceeding the first window size to the first apparatus unit in response to the acknowledge order.

BRIEF DESCRIPTION OF THE DRAWINGS

FIG. 6 is a diagram showing the format of the tail information field in an inquiry order;

FIG. 7 is a diagram showing the format of the tail information field in an inquiry order response;

FIG. 8 is a diagram showing the format of the tail information field in an autonomous status;

FIG. 9 is a diagram showing the format of the tail information field in an ACK order;

FIG. 10 is a diagram showing the format of the tail information field in an ACK order response;

FIG. 12 is a diagram showing a communication format for specifying one particular instance in the specification of multiple instances;

DESCRIPTION OF THE PREFERRED EMBODIMENTS

Figure 1:
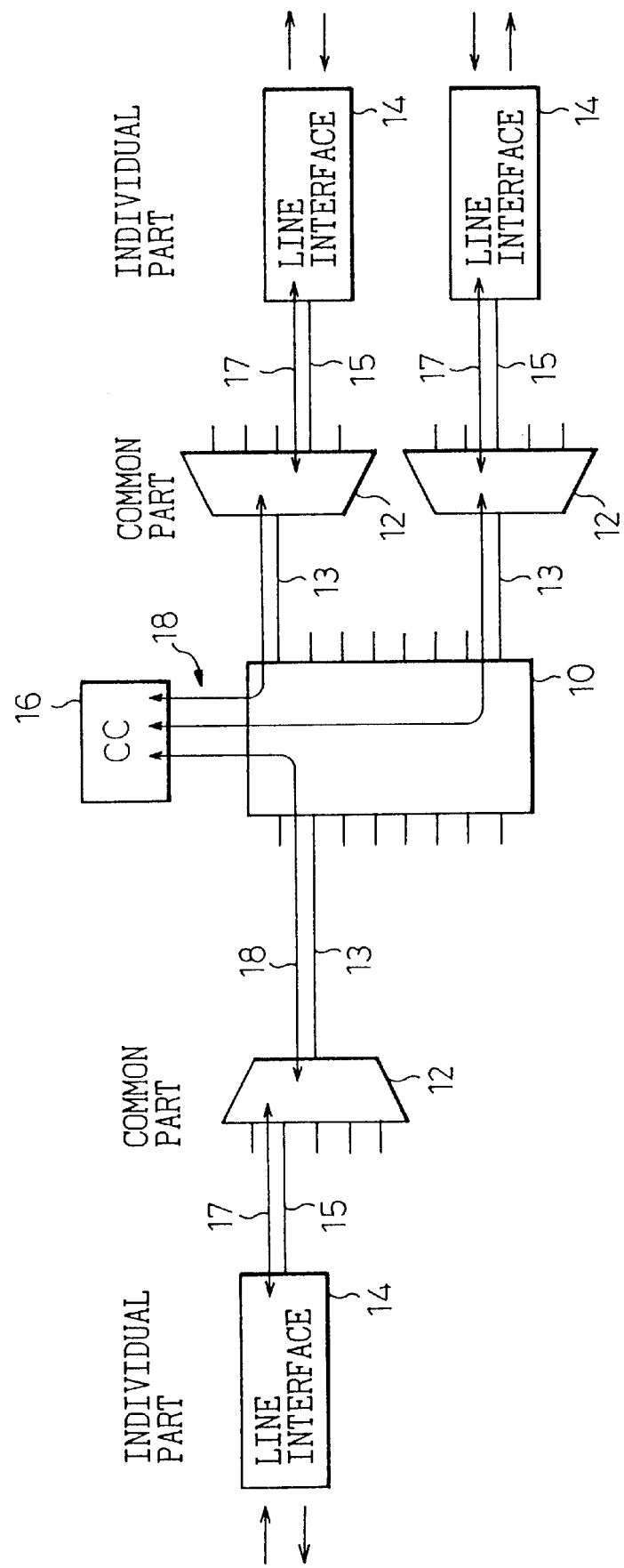
FIG. 1 is a block diagram showing the configuration of an ATM exchange for which the data collection method of the present invention is applied.

FIG. 1 shows the configuration of an ATM exchange to which the data collection method of the present invention is applied. In FIG. 1, a plurality of distribution/concentration units (common parts) 12 are connected via cell transfer highway 13 to an ATM switch 10 which performs cell switching, while a plurality of line interface units (individual parts) 14 are connected to each common part 12 via a cell transfer highway 15. To the ATM switch 10 is also connected a central control unit (CC) 16 which performs path setup control via DMA lines 18. The CC 16 also collects billing data, the number of passed cells, the number of discarded cells, etc. for setup paths from the common parts 12 via the DMA lines 18. Each individual part 14 collects PM (path monitoring) data and transfers the results to its associated common part 12 via each DMA line 17. The data transferred from the individual part 14 to the common part 12 is further transferred to the CC 16 upon request from the CC 16.

Figure 2:
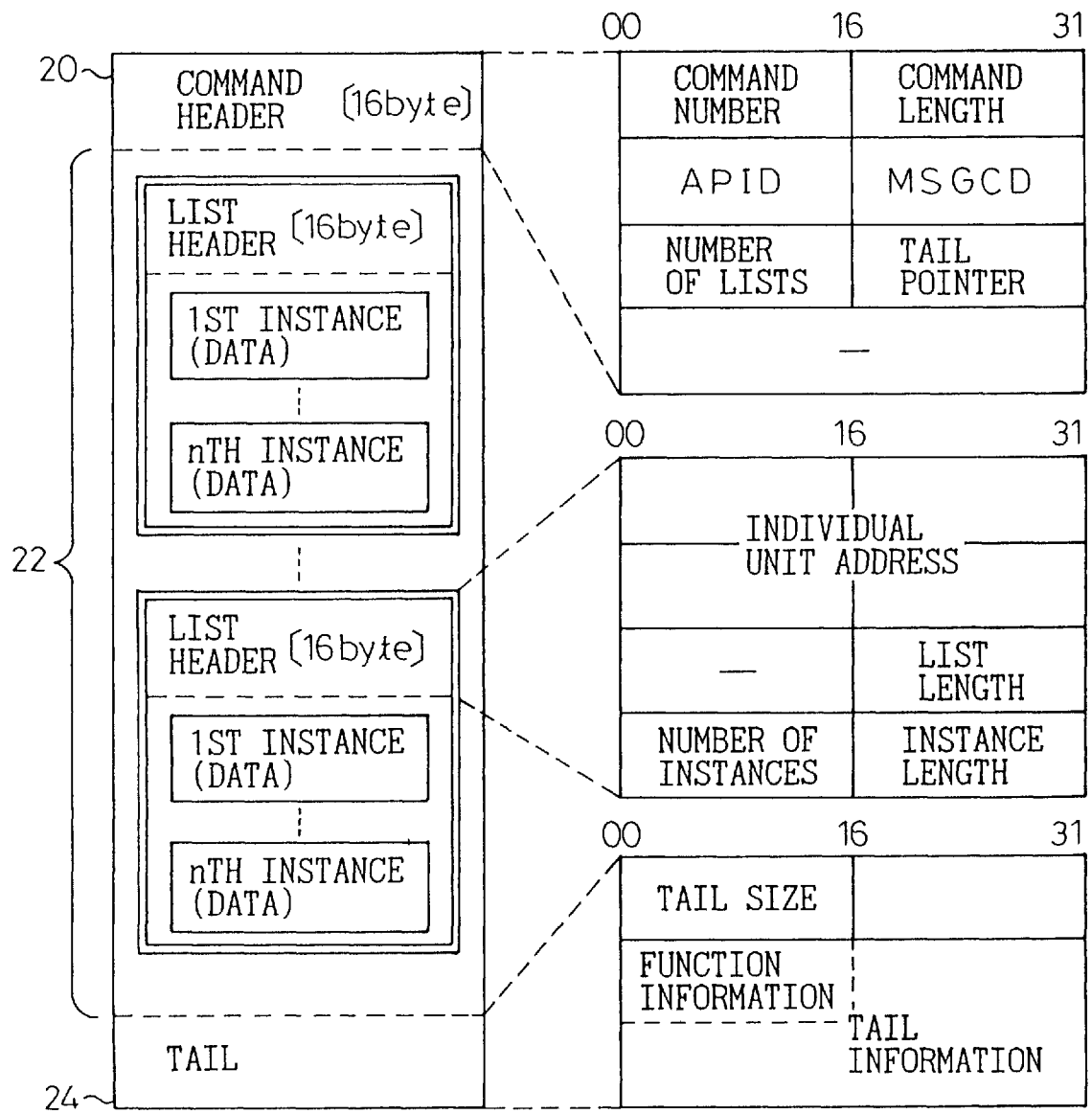
FIG. 2 is a diagram showing by way of example the basic format of a command for requesting data transmission according to the data collection method of the present invention.

FIG. 2 shows the basic format of a command that the CC 16 issues to the common parts 12. The command consists of a command header 20, a list area 22, and a tail information field 24. The command header 20 defines the command. Each list contained in the list area 22 specifies the target for which the command is intended. The tail information field 24 is an optional field which is appended when the data length of the data returned in response to the command exceeds or is likely to exceed a predetermined length.

The command header 20 contains, as shown in FIG. 2, a command number, command length, application identifier APID, message code MSGCD, the number of lists, and tail pointer. The kind of the request intended by the command is defined by the application identifier APID and message code MSGCD. The number of lists field indicates the number of individual parts for which the command is intended. The list hereinafter described is provided for each indented individual part. The tail pointer specifies the relative position of the tail information field 24 by the number of bytes under the word boundary; a 0 indicates that the tail information field 24 is not appended.

The lists in the list area 22 each consist of a list header and one or more instances, and are provided one for each individual part for which the command is intended, as noted above. The list header consists of: an individual unit address which points to the individual part corresponding to the list; list length; the number of instances contained in the list; and instance length. Each instance consists of data specifying a request item; for example, in the example shown in FIG. 2, there are first to ninth instances.

The tail information field 24 carries tail size, function information, and other tail information, the details of which will be described later.

Each common part 12 always holds monitor data collected from the individual parts 14 accommodated therein, and as the need arises, collects monitor data from each individual part 14. Upon receiving a command from the CC 16, the common part 12 analyzes its contents, examines the command heater to determine the kind of the request intended by the (command, and looks in the list header of each list to identify the individual part for which the request is intended. Then, the common part 12 responds to the CC 16 with a monitoring result (response data) from the requested individual part in accordance with the specification of each instance described in the list.

The response status that the common part returns to the CC is identical in structure to the command, except that the command header is replaced by a status header. The structure of the status header is the same as that of the command header. Each list in the response status contains the list header along with response data for each instance. The structure of the list header is also the same as that of the list header of the command. The response data for each instance consists of actual monitoring data requested for example, billing charge information in response to a billing information collection command).

Since the command and status transferred between the CC and the common parts are constructed by combining the plurality of individual parts as request targets and the instances within each individual part into one format, as described above, the amount of communication between the CC and the common parts is drastically reduced.

TAIL INFORMATION FIELD NOT APPENDED

Figure 3:
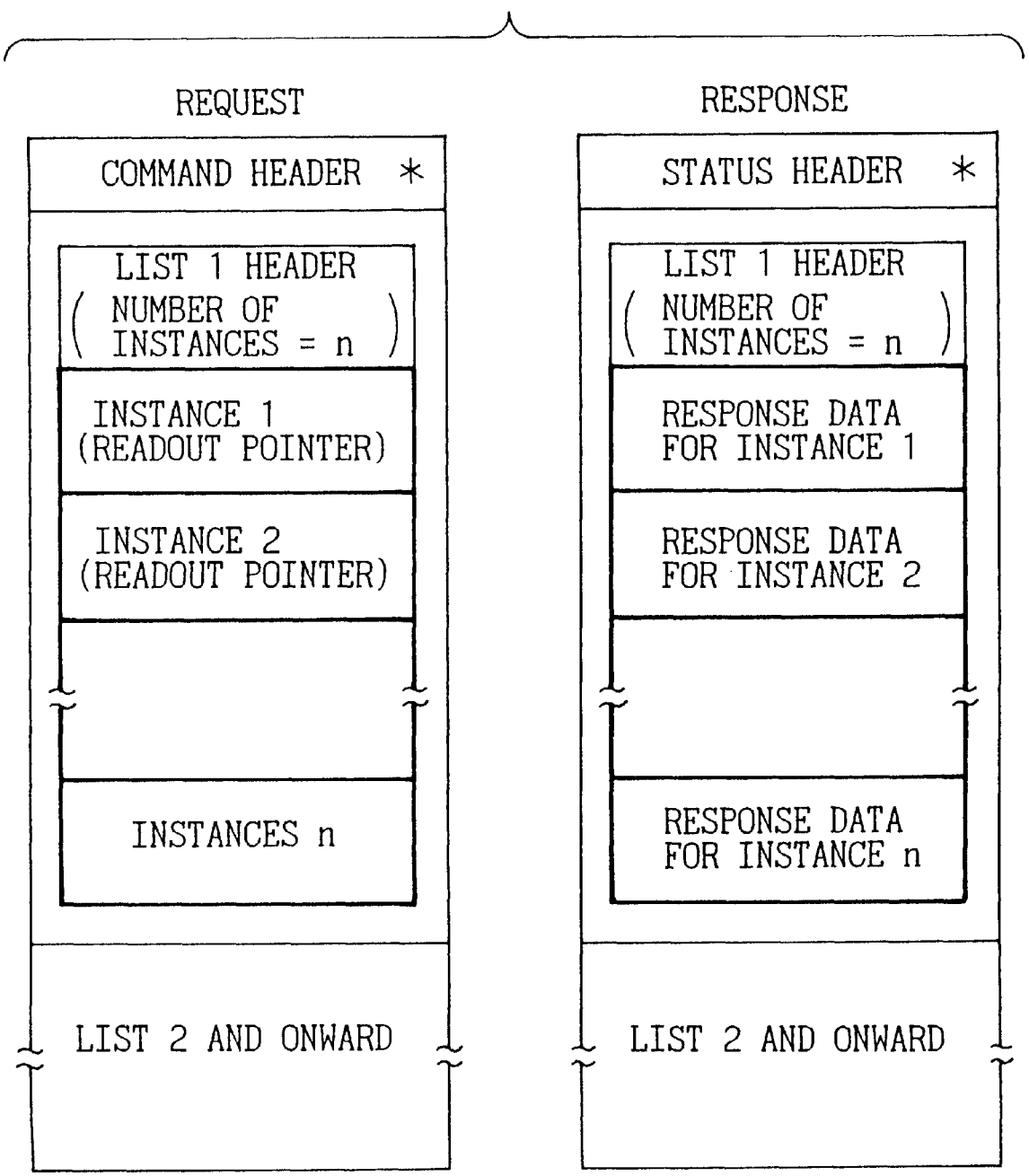
FIG. 3 is a diagram showing the format of a command and response status when no tail information field is used.

FIG. 3 shows the format of the command and response status when tail pointer=0, that is, when the tail information field is not appended. When it is certain that the data length of the command and response status will fall within a predetermined length, the communication is performed using the format with no tail information field appended, as shown. As shown in FIG. 3, in the request command issued from the CC to the command part, the tail pointer in the command header is set to 0, and lists 1, 2, etc. are carried in corresponding relationship to the individual parts for which the request is intended. Each list contains a list header and instances 1 to n corresponding to the number of instances (n) indicated in the list header. Each instance includes readout pointer data.

On the other hand, the response status from the common part to the CC consists of the status header and lists. The tail pointer in the status header is set to 0. The lists correspond to the lists contained in the request command, and carry response data for the instances requested in the command. That is, the monitoring results from the plurality of individual parts requested by a single command from the CC to the common part are returned from the common part to the CC in the form of a single status. This has the effect of drastically reducing the amount of communication between the CC and the common part.

Figure 4:
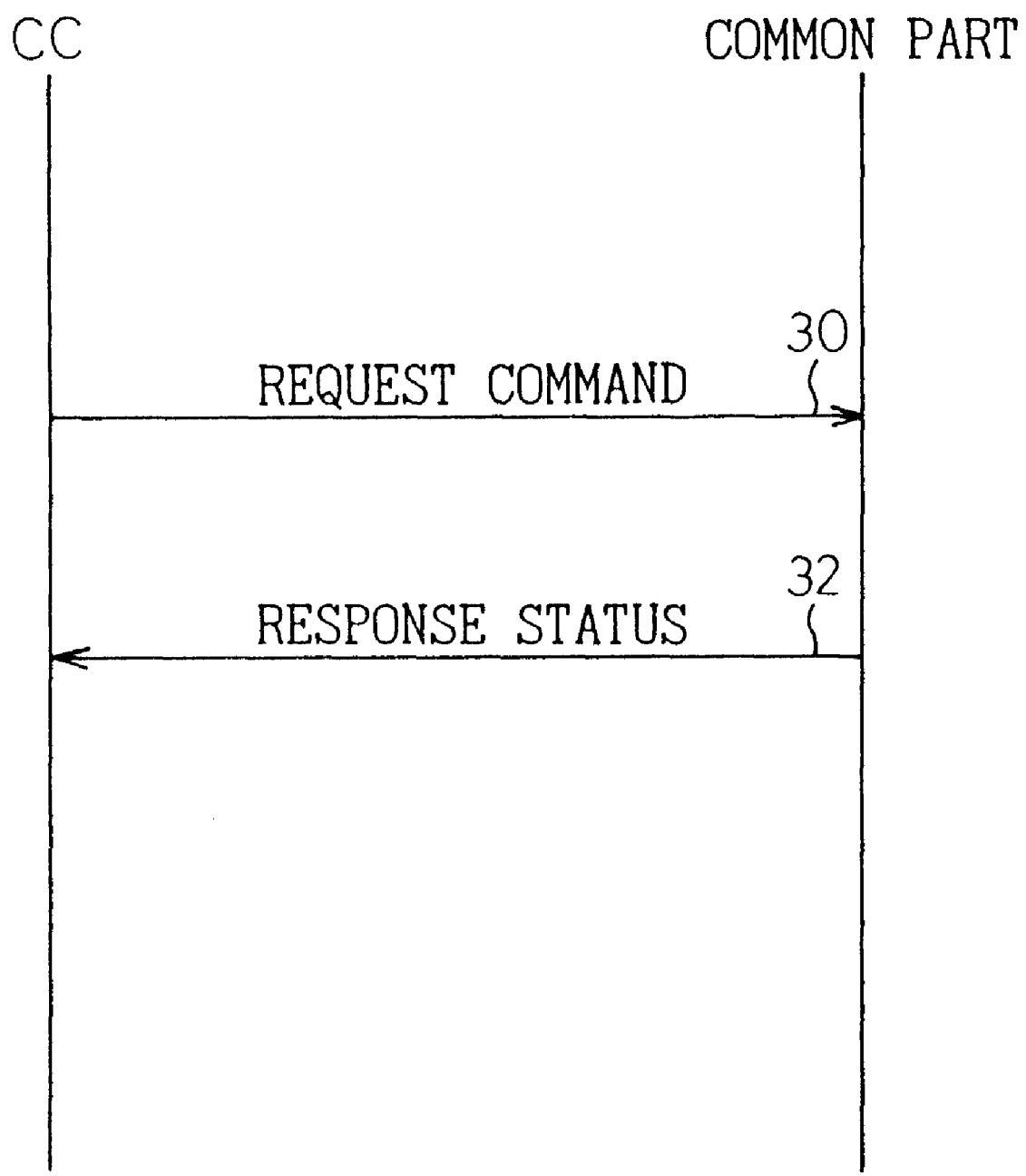
FIG. 4 is a diagram showing a communication sequence when no tail information field is used.

FIG. 4 shows a communication sequence between the CC 16 and the common part 12 when tail pointer=0. In this case, the communication is accomplished by only transferring one request command 30 and one response status 32. The maximum number of specifiable instances is set by considering the message length of the response status so that all response data for instances 1 to n can be accommodated within one status. If there is more than one list, the lists are arranged within one command; in this case also, the number of lists specified is adjusted by considering the message length of the response status so that all response data can be accommodated within one status. The illustrated communication sequence is used, for example, for path setup, fault information readout by an administrator command, billing information collection (fixed length), etc.

TAIL INFORMATION FIELD APPENDED

Figure 5:
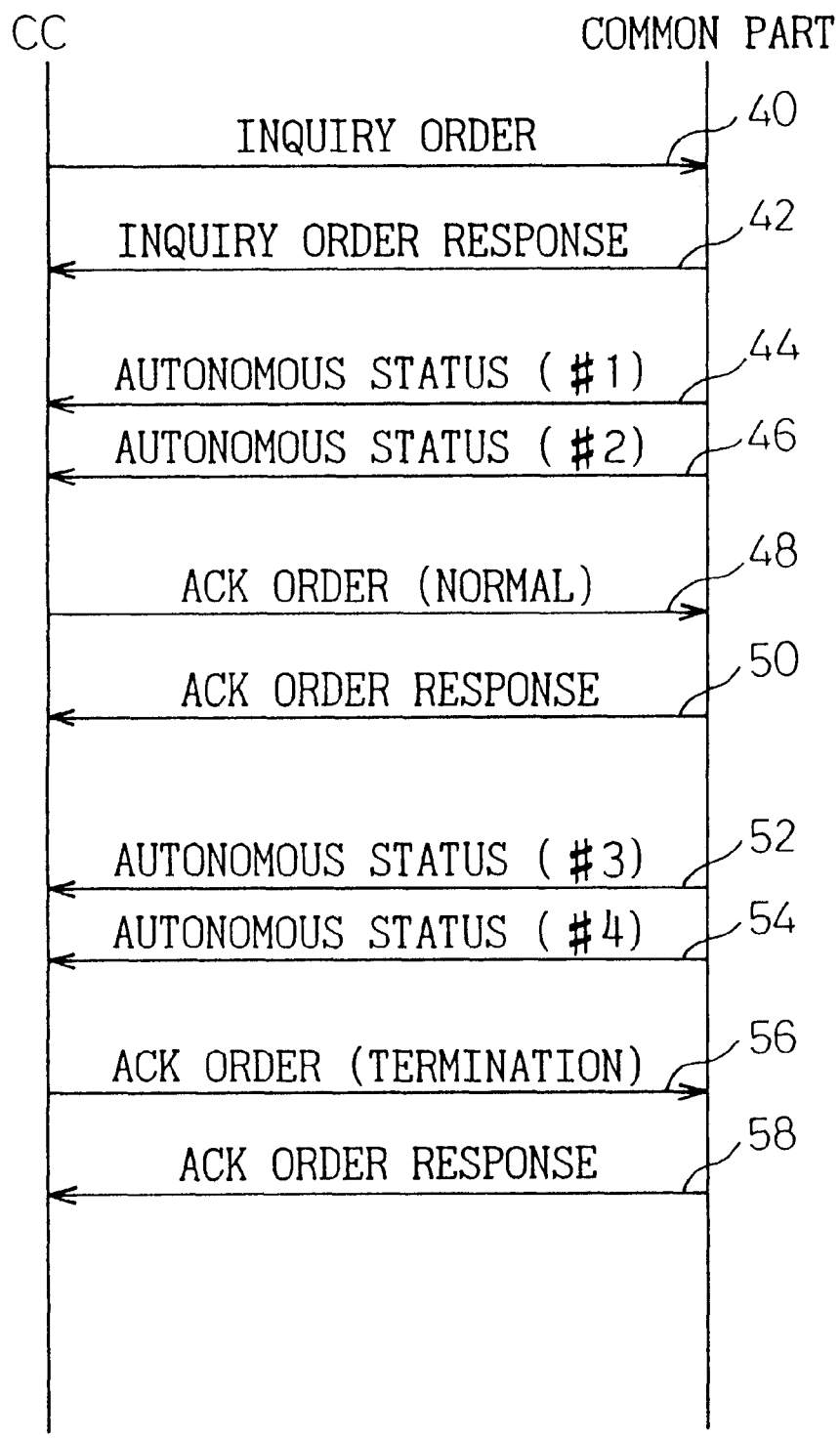
FIG. 5 is a diagram showing a communication sequence when a tail information field is used.

When it is certain that the amount of data to be transferred from the common part in response to a request from the CC will not fit within one status, or when there is a possibility that the data from the common part will not fit within one status because the data is of variable length, then the communication is performed using a format with the tail information field appended. FIG. 5 is a diagram showing a simplified communication sequence for command/status transfers between the CC and the common part when the tail information part is used.

First, an outline of this sequence will be described. In FIG. 5, the CC issues an inquiry order 40 as a command to the common part which, in response, returns an inquiry order response 42 as a response status to the CC. The inquiry order 40 specifies the contents of the request intended by the command and the amount of response data (WS value) that the CC can receive. The inquiry order response is an answer to the inquiry order, and includes the specification of the data amount with which the common part can respond (WS value: CC specified WS value ≧ common part specified WS value). Subsequent to the inquiry order response 42, the common part sends autonomous statuses 44 and 46 to the CC. The autonomous statuses include lists containing response data for each individual part. If one status is not enough, a plurality of statuses are sent in succession as an autonomous status group.

When the response data in the amount specified in the inquiry order response from the common part is received, the CC sends an ACK order 48 to the common part. When requesting a transmission of additional response data, the ACK order 48 includes a "normal" code and the amount of response data. When terminating the communication, a "termination" code is included. When the ACK order (normal) 48 is sent to the common part, the common part in response returns an ACK order response 50, followed by autonomous statuses 52 and 54 for transmission of the additional response data. In this case also, if one status is not enough, a plurality of statuses are sent in succession as an autonomous status group. When all necessary response data have been received, the CC sends an ACK order (termination) 56 to the common part, in response to which the common part returns an ACK order response 58 to terminate the sequence.

A detailed description will now be given of the data format of each command and status transferred in the sequence of FIG. 5 with a tail information appended thereto.

First, the inquiry order 40 consists of the command header 20 of the format shown in FIG. 2, the list area 22, and the tail information field 24; the tail pointer in the command header specifies the position of the tail information field by the number of bytes from the beginning of the command. The tail information field has the format shown in FIG. 6. In FIG. 6, each item has the following meaning. In the description below, the suffix "h" indicates a hexadecimal denotation and "b" indicates a binary notation.

Function information:
 0001h=Specification of all instances
 0002h=Specification of multiple instances
 0003h=Specification of all lists
 0004h=Specification of multiple lists Event: 00100000b=Inquiry
WS value: CC specified WS value When the function information is "0001h", all instances are specified, which means that response data is requested for all the instances of a particular list specified in the list area 22. When it is "0002h", multiple instances are specified, which means that response data is requested for one or more instances of a particular list specified in the list area. When it is "0003h", all lists are specified, which means that response data is requested for a particular instance of all the lists specified in the list area. When it is "0004h", multiple lists are specified, which means that response data is requested for a particular instance of one or more lists specified in the list area. The event means an inquiry when set to "00100000b". The WS value means a window size which the CC uses to specify the amount of data transfer that the CC can accept.

Next, the inquiry order response consists of the status header, list area, and tail information field; the tail pointer in the status header specifies the position of the tail information field by the number of bytes from the beginning of the status. The tail information field has the format shown in FIG. 7. In FIG. 7, each item has the following meaning.

Function information: Carries the same value as set in the inquiry order
Event:
 00110000b=Inquiry response
 00110001b=Inquiry response (with data)
Status number: Data readout plane (0 to n planes)
WS value: Common part specified WS value (CC specified WS ≧ common part specified WS) This value is set to 0 when data is contained in the response status.
Cause code:
 00h=Normal
 01h=Fault
 02h=Retransmission request
 03h=Resource busy
Number of transmitted SHW: The number of lists when all lists are specified (1 when all instances are specified)
Total number of messages: Total number of messages to be sent
Common part sequence number: Sequence number assigned to autonomous status group
Number of messages: The number of messages (autonomous statuses) to be transmitted within group
Number of instances: The number of instances within group Here, the function information is set to the same value as set in the inquiry order. The event "00110000b" means an inquiry response, while the event "00110001b" means an inquiry order response with response data included therein which will be described later. The status number defines the data readout plane (0 to n planes). The data readout plane is a physical pointer to a time series data item in an instance consisting of (n+1) time series data items. The WS value specifies the amount of data with which the common part can respond, and is set to a value smaller than or equal to the WS value specified by the CC. The cause code "00h" means normal, "01h" means fault, "02h" means retransmission request, and "03h" means resource busy. The number of transmitted SHW indicates the number of lists when all lists are specified in the inquiry order. The total number of messages is the total number of messages (autonomous statuses) to be sent in response. The common part sequence number is a sequence number uniquely assigned to each autonomous status group. The number of messages indicates the number of messages (autonomous statuses) to be transmitted within each group, and the number of instances indicates the number of instances within each group. The common part sequence number, the number of messages, and the number of instances correspond to the contents of the lists transferred as response data in the subsequently sent autonomous status.

Next, the autonomous status consists of the status header, list area, and tail information field, in common with the structure shown in FIG. 2. The tail information field has the format shown in FIG. 8. In FIG. 8, each item has the following meaning.

Function information: Carries the same value as set in the inquiry order
Event: 01110000b=Autonomous status
Status number: Data readout plane (0 to n planes)
Common sequence number: Same as previously described
Individual part sequence number: Sequence number of autonomous status within group Here, the function information is set to the same value as set in the inquiry order. The event "01110000b" means an autonomous status. The status number defines the data readout plane (0 to n planes). The individual part sequence number is the sequence number assigned to the autonomous status within the group Next, the ACK order consists of the command header, list area, and tail information field. The tail information field has the format shown in FIG. 9. In FIG. 9, each item has the following meaning.

Function information: Same value as set in inquiry order
Event:
 01000000b=ACK normal
 01000010b=ACK termination
 10000000b=Forced termination
Status number: Echoes back status number reported from common part in immediately preceding sequence. Ignored in the case of forced termination.
WS value: Specified by CC (specifies WS value to be used in the next sequence)
Common part sequence number: Sequence number from which next status response is expected
Individual part sequence number: Sequence number from which next status response is expected Here, the function information is set to the same value as set in the inquiry order. The event "01000000b" means ACK normal which reports normal reception of the requested response data and requests transmission of the next response data, whiles "01000010b" means ACK termination which reports normal reception of the requested response data and requests termination of the sequence. On the other hand, "10000000b" means forced termination which indicates a request that the sequence be forcefully terminated even when the requested response data has not been received normally. The status number echoes back the status number reported from the common part in the immediately preceding sequence, but this is ignored when the event is forced termination. The WS value is specified by the CC as the WS value to be used in the next sequence when the event is normal. The common part sequence number carries the common part sequence number from which the next status response is expected, while the individual part sequence number carries the individual part sequence number from which the next status response is expected.

Next, the ACK order response consists of the status header, list area, and tail information field. The tail information field has the format shown in FIG. 10. In FIG. 10, each item has the following meaning.

Function information: Carries the same value as set in the inquiry order
Event:
 01010000b=ACK normal response
 01010010b=ACK termination response
 10010000b=Forced termination response
Status number: Data readout plane (0 to n planes)
WS value: Specified by common part (CC specified WS≧common part specified WS)
Cause code:
 00h=Normal
 01h=Fault
 03h=Resource busy
Number of reported messages: Number of messages to be reported within specified WS
Number of reported instances: Number of instances to be reported within specified WS
Common part sequence number: Sequence number to transmit next status response
Individual part sequence number: Sequence number to transmit next status response Here, the function information is set to the same value as set in the inquiry order. The event "01010000b" means ACK normal response- which indicates a normal response reporting that the common part is able to transmit the requested response data, while "01010010b" means ACK termination and "10010000b" means forced termination. The status number defines the data readout plane. The WS value specifies the amount of response data with which the common part can respond, but within a range not exceeding the WS value specified by the CC. The cause code "00h" means normal, "01h" fault, and "03h" resource busy. The number of reported messages carries the number of messages to be reported within the specified WS range, and the number of reported instances carries the number of instances to be reported within the specified WS range. The common part sequence number carries the common part sequence number with which the next status response is transmitted, while the individual part sequence number carries the individual part sequence number with which the next status response is transmitted.

The following shows the formats of the inquiry order, inquiry order response, and autonomous status in various situations where the function information is set to the various values. Note, however, that when it is found that the actual amount of data requested by the inquiry order can be accommodated within the inquiry order response, the requested data is included in the inquiry order response and the autonomous status is not used.

Figure 11:
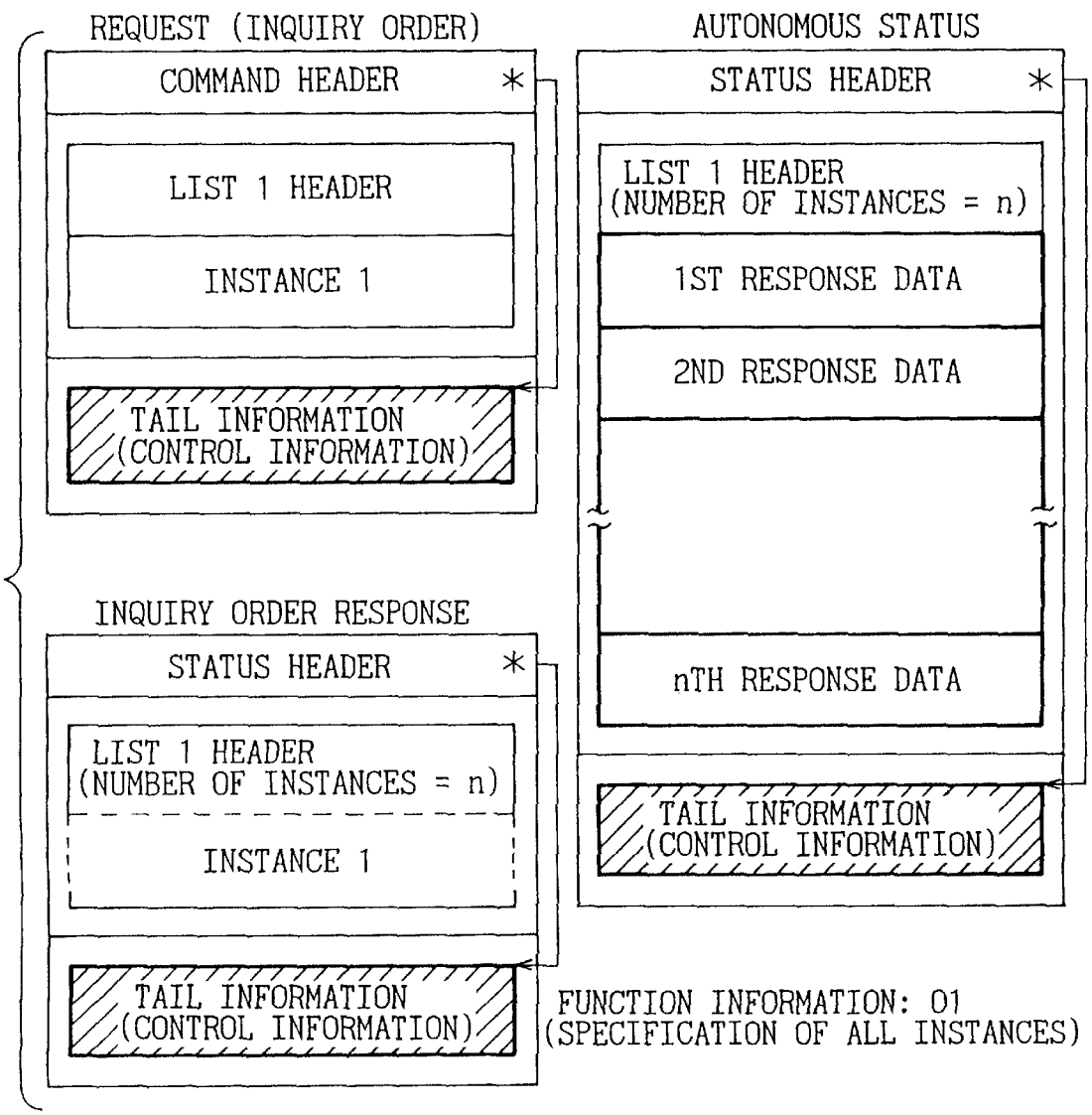
FIG. 11 is a diagram showing a communication format for specifying all instances.

FIG. 11 shows the communication format used when the function information is set to specification of all instances. This format is used, for example, for PM readout, periodic collection of failure information, statistic data, billing information collection (fixed length), etc.

In the inquiry order, the function information in the tail information field is set to 0001h (specification of all instances) to implement request control for all instances in a specified list with one command, and the WS value is set to specify the window size within which the CC can accept data. The window size WS value, which is controlled by software, defines the maximum quantity of data that can be collected with one command. The list consists only of the list header and first instance, and information indicating the specification of all instances is carried in the first instance.

In the inquiry order response, the WS value is set in the tail information to specify the amount of data within which the common part can respond, and the number of response instances is set in the list. In the autonomous status that follows the inquiry order response, response data as actual response data for all instances (1 to n) are carried in the list. The number of autonomous statuses is managed by the tail information.

FIG. 12 shows the communication format used when the function information is set to specification of multiple instances. This format is used, for example, for protocol failure logging, frame tracing, etc.

FIG. 12 shows an example in which only one instance is specified with one command (inquiry order), but the message length of the response status (autonomous status) is variable and all response data cannot be accommodated within one status. The function information in the tail information field of the inquiry order is set to 0002h (specification of multiple instances), and the list is set to carry the number of instances=1 in the list header and the readout pointer information in instance 1. The number of autonomous statuses is managed by the tail information; in the example of FIG. 12, since the response data amount for instance 1 is large, the data is divided between two autonomous statuses #1 and #2, and the first half of the response data for instance 1 is transmitted to the CC with the autonomous status #1 and the second half of it with the autonomous status #2.

Figure 13:
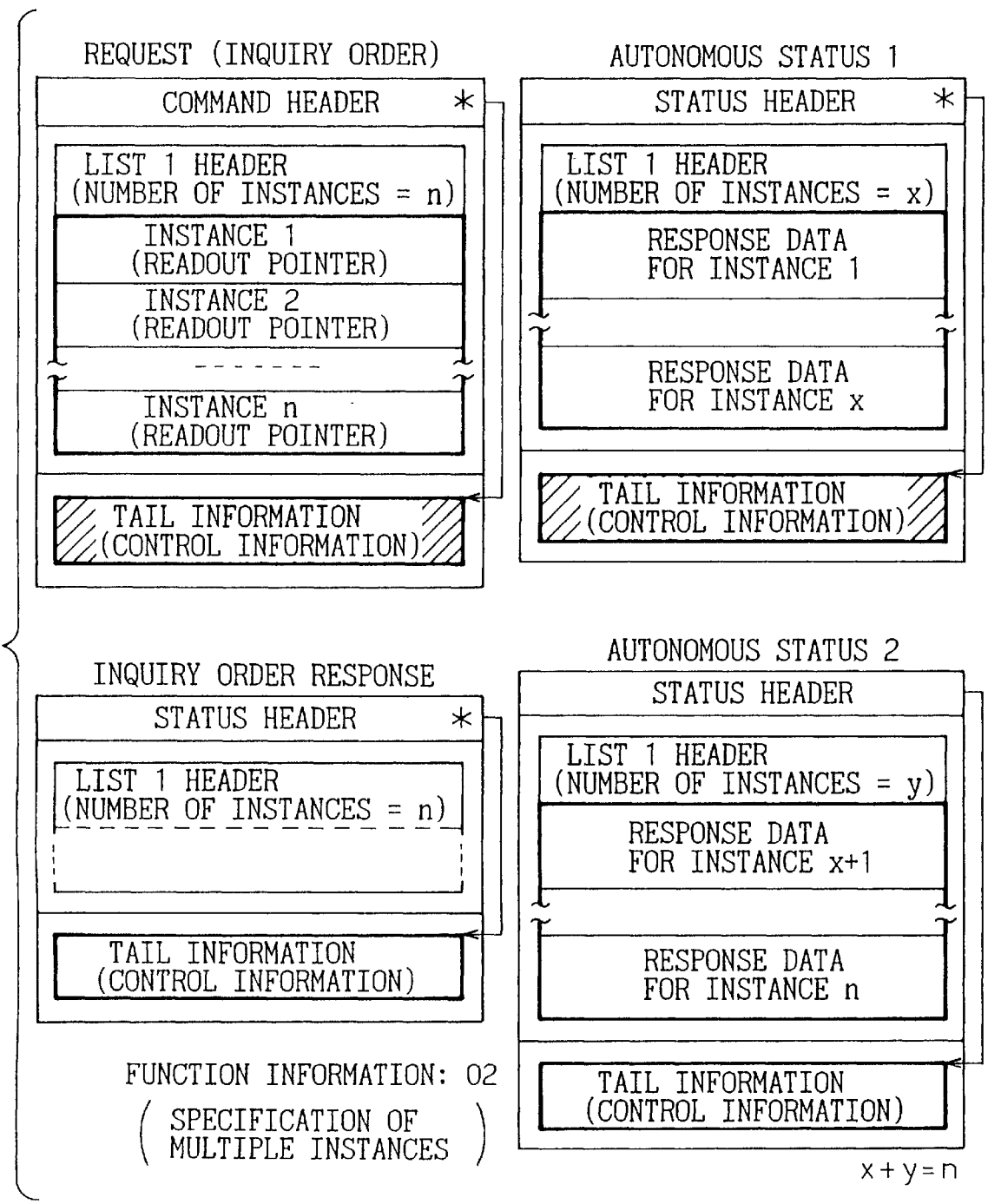
FIG. 13 is a diagram showing a communication format for specifying a plurality of instances in the specification of multiple instances.

FIG. 13 shows an example in which a plurality of instances are specified with one command (inquiry order), but the message length of the response status (autonomous status) is variable and all response data cannot be accommodated within one status. The function information in the tail information field of the inquiry order is set to 0002h (specification of multiple instances), and the list area is set to carry the number of instances=n in the list header and the readout pointer information in each of instances 1 to n. The number of autonomous statuses is managed by the tail information; in the example of FIG. 13, since the total amount of response data for instances 1 to n is large, the entire data is divided between two autonomous statuses #1 and #2; in the autonomous status #1, the number of instances is set to x and response data for instances 1 to x are transmitted to the CC, while in the autonomous status #2, the number of instances is set to y (where x+y=n) and response data for instances x+1 to n are transmitted to the CC.

Figure 14:
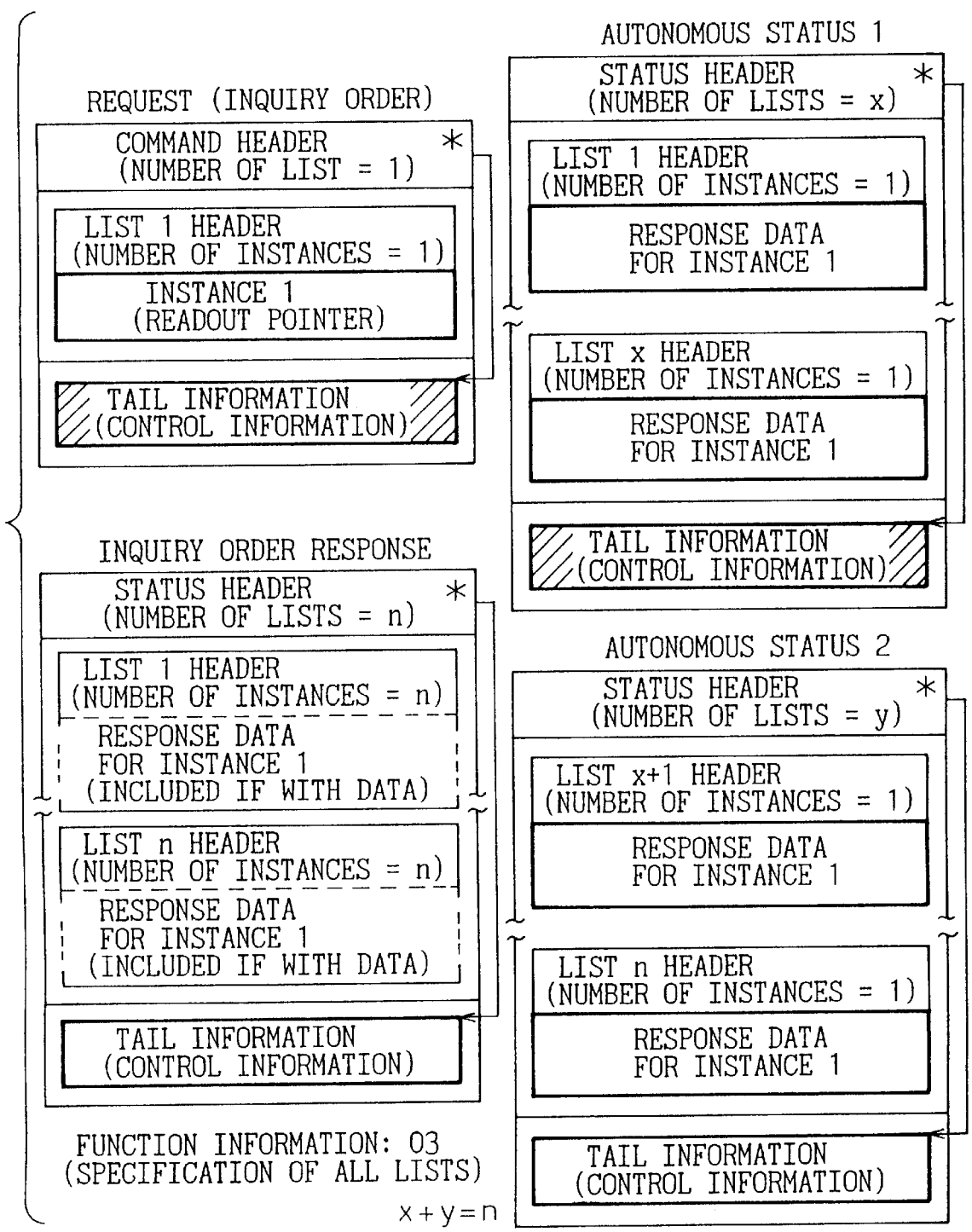
FIG. 14 is a diagram showing a communication format for specifying all lists.

FIG. 14 shows the Communication format used when the function information is set to specification of all lists. This format is used, for example, for the initial setting of all interface units, billing information collection for all PVCs, and SVCs after resumption.

The function information in the tail information field is set to 0003h (specification of all lists) to implement request control for all lists with one command (inquiry order), and the WS value is specified. The number of lists=1 is set in the command header, and information indicating the specification of all lists is carried in the list header of the first list. The window size WS value, which is controlled by software, defines the maximum quantity of data that can be collected with one command. The response data is divided between a plurality of autonomous statuses; in the autonomous status #1, the number of lists=x is set in the status header, and the response data is entered in lists 1 to x, while in the autonomous status #2, the number of lists=y (where x+y=n) is set in the status header, and the response data is entered in lists x+1 to n.

The communication format used when the function information is set to specification of multiple lists (0004h) is the same as that shown in FIG. 13 used when specifying multiple instances, except that multiple lists are specified in the former.

Next, specific examples of communication sequences between the CC and the common part (distribution/concentration unit) will be described with reference to FIGS. 15 to 21.

Figure 15:
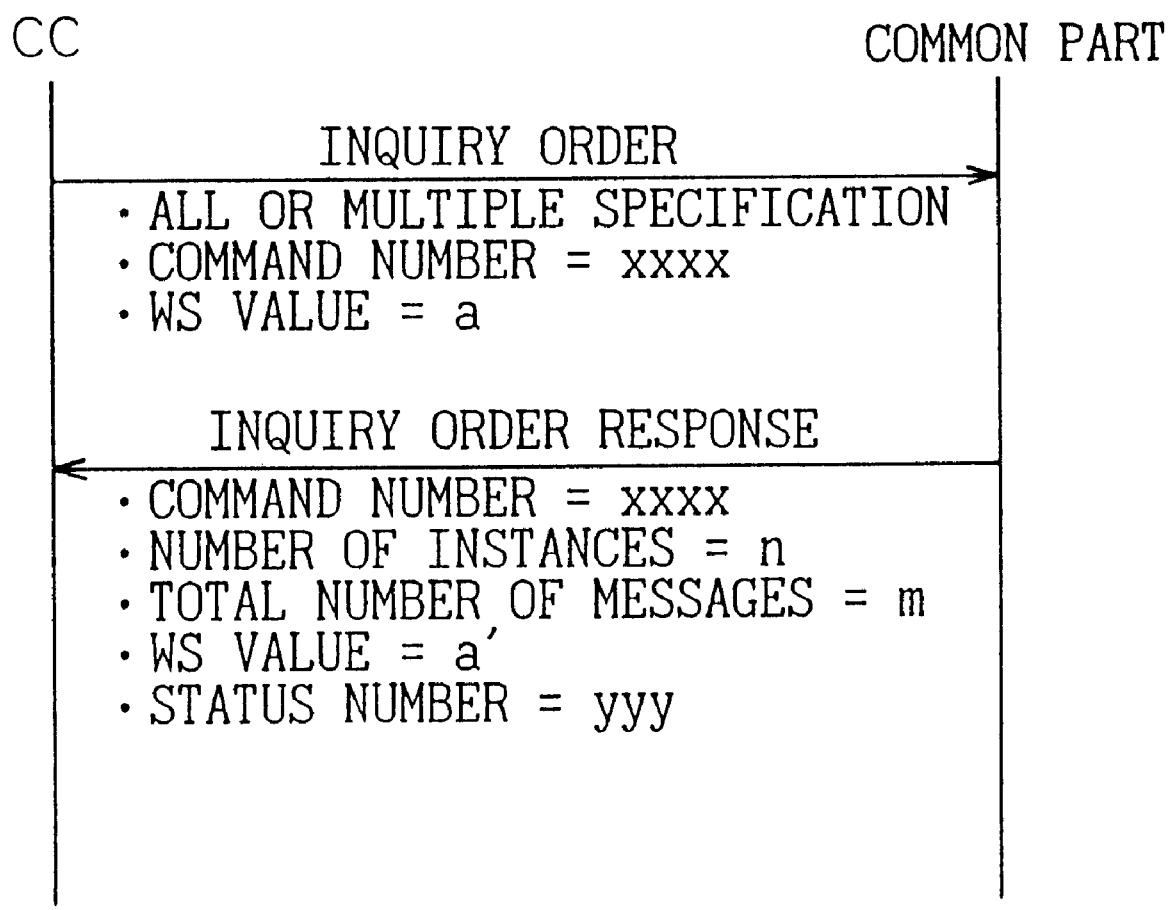
FIG. 15 is a diagram showing a specific example of a communication sequence for start declaration.
Figure 16:
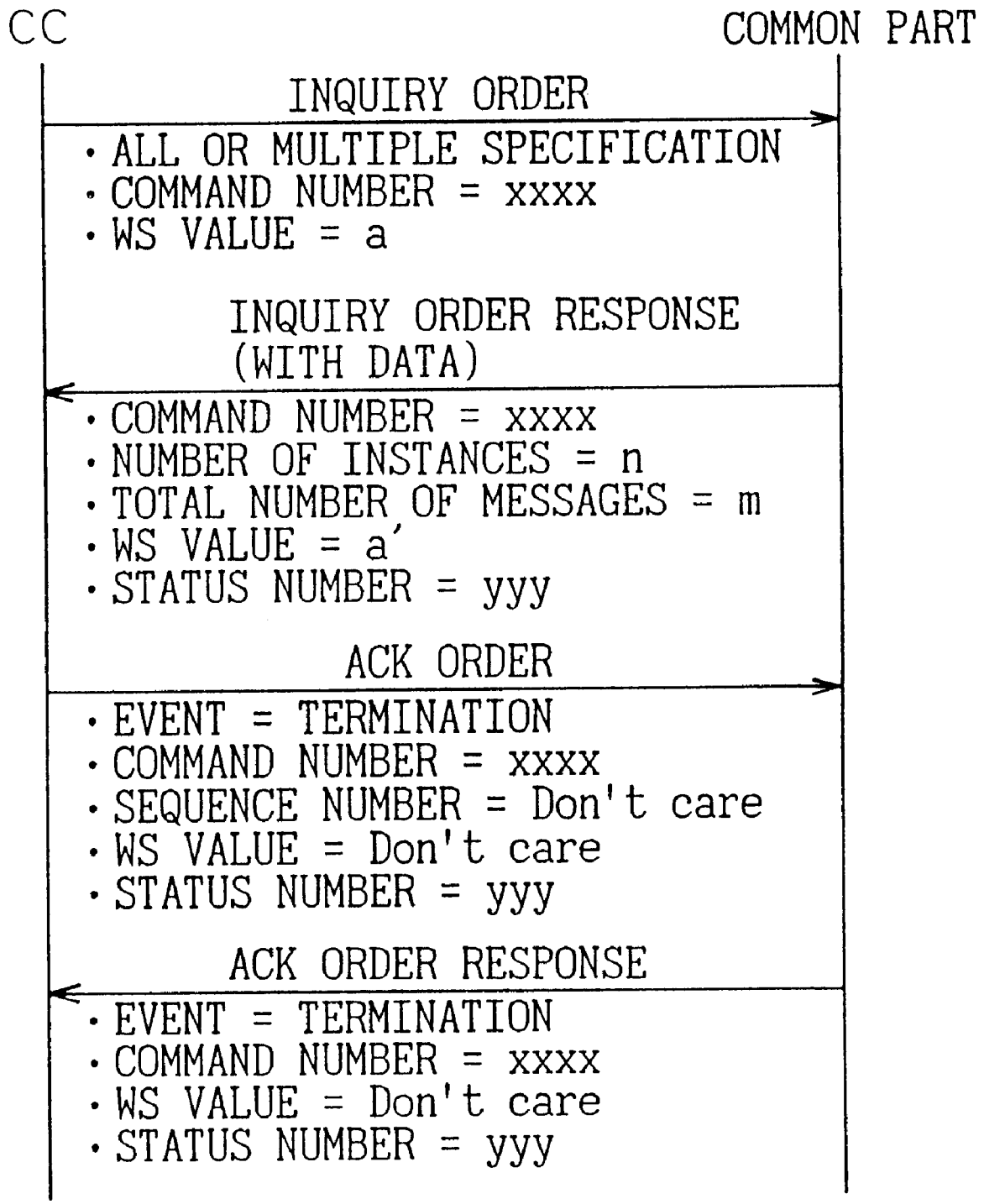
FIG. 16 is a diagram showing a specific example of a communication sequence when data is set in an inquiry order response.

FIG. 15 shows a specific example of a communication sequence for start declaration. The inquiry order is set as follows:

Function information=ALL or MULTIPLE specification (0001h–0004h)
Command number=xxxx
WS value=a In response to this inquiry order, if the number of instances for which the common part can return response data is n and the total number of messages (number of autonomous statuses) is m, the inquiry order response is set as follows:
Command number=xxxx
Number of instances=n
Total number of messages=m
WS value=a' (where a≧a')
Status number=yyy FIG. 16 is a diagram showing a specific example of a communication sequence when data is set in the inquiry order response itself. The inquiry order is set as follows:
Function information=ALL or MULTIPLE specification
Command number=xxxx
WS value=a In response to this inquiry order, if the number of instances for which the common part can return response data is n and the total number of messages is m, and if all response data can be accommodated within one response status, the inquiry order response is constructed to include the response data in the lists and is set as follows:
Command number=xxxx
Number of instances=n
Total number of messages=m
WS value=a' (where a≧a')
Status number=yyy In response to this inquiry order response, the CC returns an ACK order to terminate the communication sequence. The ACK order is set as follows:
Event=Termination
Command number=xxxx
Sequence number=Don't care (Ignore)
WS value=Don't care (Ignore)
Status number=yyy In response to this ACK order, the common part returns an ACK order response which is set as follows:
Event=Termination
Command number=xxxx
WS value=Don't care (Ignore)
Status number=yyy With this procedure, the communication sequence is terminated.

Figure 17:
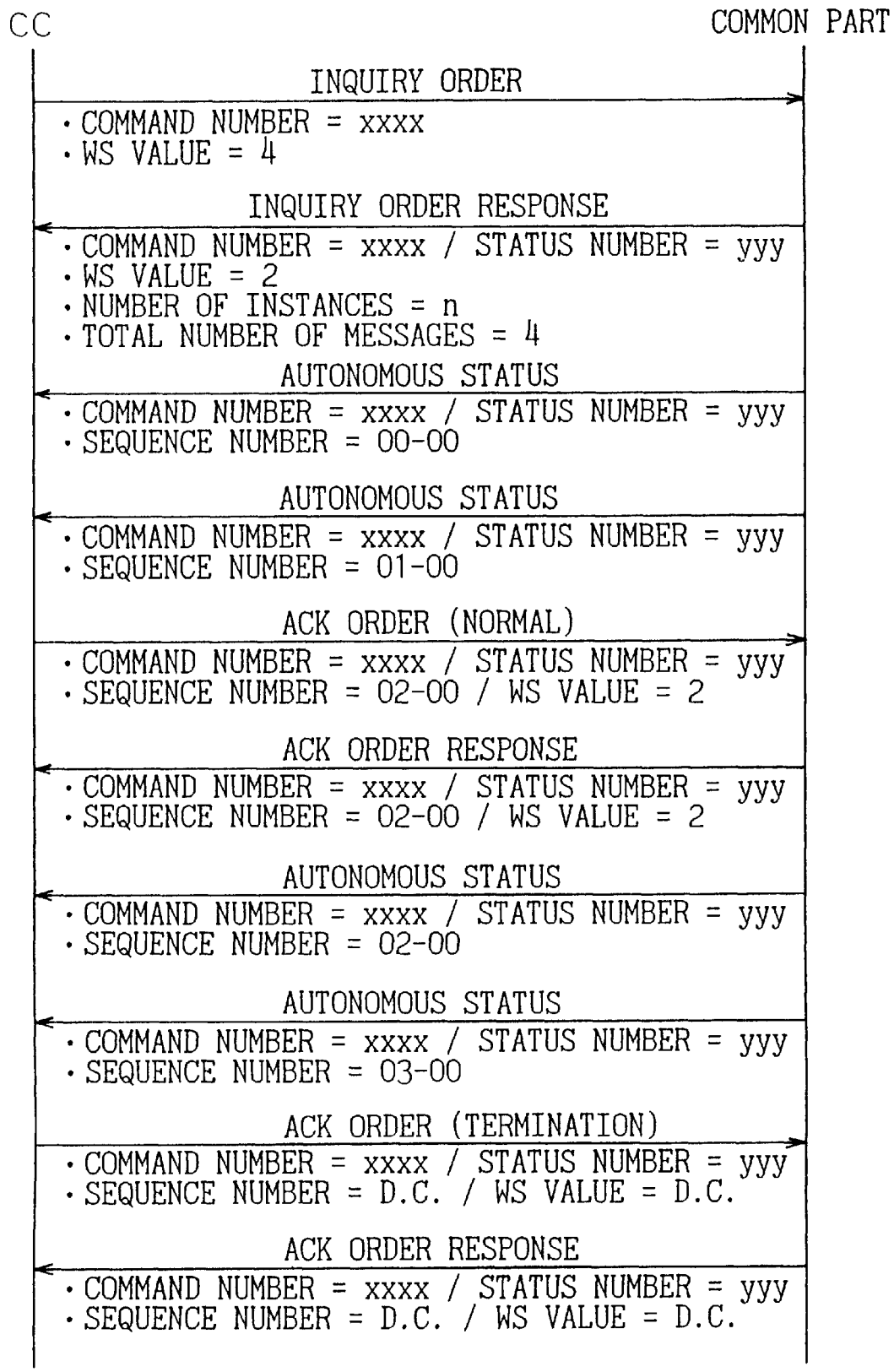
FIG. 17 is a diagram showing a specific example of a communication sequence when data is transferred using autonomous status.

FIG. 17 shows a specific example of a communication sequence when the data to be sent from the common part to the CC cannot be accommodated within the inquiry order response and therefore requires the use of autonomous status. The inquiry order is set as follows:
Command number=xxxx
WS value=4

Here, WS value=4 indicates that the CC is able to accept up to four autonomous statuses.

In response to this inquiry order, if the number of instances for which the common part should return response data is n and the total number of messages (total number of autonomous statuses) is m, and the number of messages (WS value) that can be actually sent is 2, the inquiry order response is set as follows:
Command number=xxxx
Status number=yyy
WS value=2
Number of instances=n
Total number of messages=4

This inquiry order response is followed by two autonomous statuses each of which carries response data in the list. The first autonomous status #1 is set as follows:
Command number=xxxx
Status number=yyy
Sequence number 00-00

The second autonomous status #2 is set as follows:
Command number=xxxx
Status number=yyy
Sequence number 01-00

In response to these autonomous statuses, the CC issues an ACK order requesting transmission of further response data as the CC needs to receive two more autonomous statuses and is able to accept them. In this case, the ACK order is set as follows:
Event=Normal
Command number=xxxx
Status number=yyy
Sequence number=02-00
WS value=2

In response to this ACK order, upon collecting further transmittable response data (memory capacity equivalent to WS value=2) the common part notifies the CC by returning an ACK order response, and then transmits the response data. In this case, the ACK order is set as follows:
Event=Normal response
Command number=xxxx
Status number=yyy
Sequence number=02-00
WS value=2

This is followed by two autonomous statuses each of which carries response data in the list. The autonomous status #3, the third from the beginning, is set as follows:
Command number=xxxx
Status number=yyy
Sequence number 02-00

The fourth autonomous status #4 is set as follows:
Command number=xxxx
Status number=yyy
Sequence number 03-00

In response to the autonomous statuses #3 and #4, the CC returns an ACK order for termination of the communication sequence. The ACK order (termination) is set as follows:
Event=Termination
Command number=xxxx
Status number=yyy
Sequence number=Don't care (Ignore)
WS value=Don't care (Ignore)

In response to this ACK order, the common part returns an ACK order response (termination response) which is set as follows:
Event=Termination response
Command number=xxxx
Status number=yyy
Sequence number=Don't care (Ignore)
WS value=Don't care (Ignore)

With this procedure, the communication sequence is terminated.

In the above example, the WS value specified by the CC is not smaller than the total number of messages, while the WS value specified by the common part is smaller than the total number of messages; therefore, data transfers are performed with the data collection step in the common part serving as the rate-determining step. On the other hand, if the WS value specified by the CC is set smaller than the total number of messages (the WS value specified by the common part is also smaller than the total number of messages since CC specified WS value≧common part specified WS value), the data accepting step in the CC serves as the rate-determining step. For example, suppose that the total number of messages is 4, and the CC specified WS value and the common part specified WS value are both 2. In that case, after the first two autonomous statuses have been transferred in succession following the inquiry order response, an ACK order for permitting the transfer of the remaining two autonomous statuses will not be issued until after the CC becomes ready to accept the data.

In this way, the amount of communication can be controlled using the WS value, making it possible to control the amount of communication for data collection according to the condition of traffic congestion.

Figure 18:
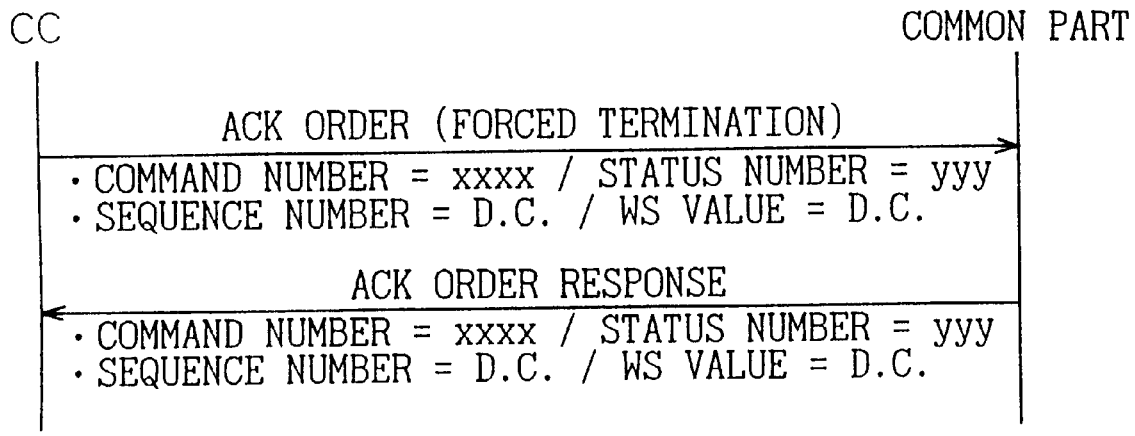
FIG. 18 is a diagram showing a sequence for forceful termination processing.

FIG. 18 shows a specific example of a communication sequence for forced termination processing. When it is desired to forcefully terminate a communication process in the middle of a communication, the CC issues an ACK order for forced termination. The ACK order (forced termination) is set as follows:
Event=Forced termination
Command number=xxxx
Status number=yyy
Sequence number=Don't care (Ignore)
WS value=Don't care (Ignore)

In response to this ACK order, the common part returns an ACK order response (forced termination response) which is set as; follows:
Event=Forced termination response
Command number=xxxx
Status number=yyy
Sequence number=Don't care (Ignore)
WS value=Don't care (Ignore)

With this procedure, the communication sequence is forcefully terminated.

Figure 19:
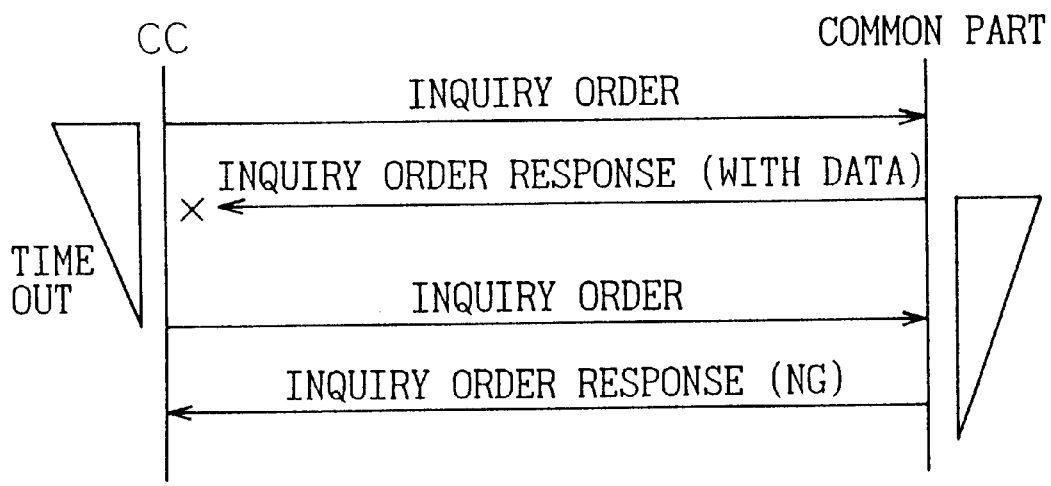
FIG. 19 is a diagram showing a sequence for retransmission of an inquiry order.

FIG. 19 shows a specific example of a communication sequence when an inquiry order response (with response data) from the common part has failed to reach the CC and the CC therefore retransmits the inquiry order, which, however, is rejected by the common part. FIG. 19 assumes the situation where, in response to the first inquiry order from the CC, the common part returns an inquiry order response with response data included therein, but the inquiry order response fails to be received by the CC. When a predetermined period of time has elapsed and yet an inquiry order response has not been received, the CC reissues the same inquiry order to the common part. This inquiry order is received by the common part, but since its contents are the same as the first inquiry order, the common part determines that some failure has occurred in the communication between the CC and the common part, and returns an inquiry order response with NG data (data reporting the occurrence of a failure) to the CC.

Figure 20:
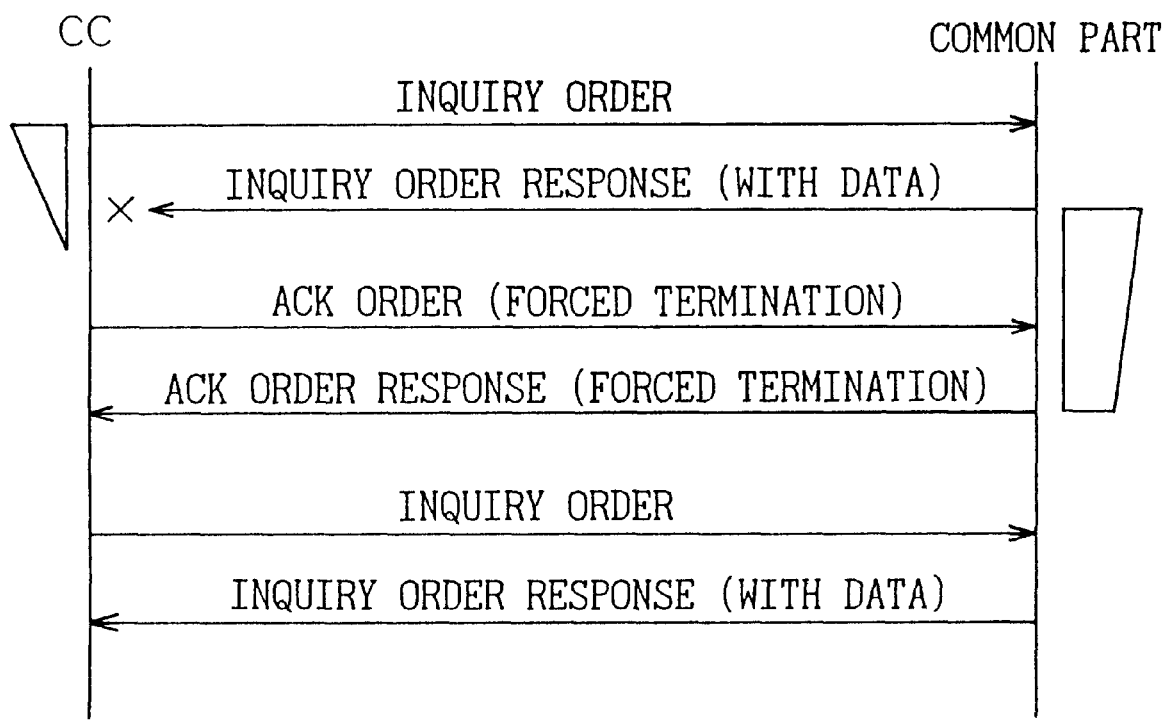
FIG. 20 is a diagram showing another example of the sequence for retransmission of an inquiry order.

FIG. 20 is another example of the communication sequence for inquiry order retransmission. FIG. 20 assumes the situation where, in response to the first inquiry order from the CC, the common part returns an inquiry order response carrying response data, but the inquiry order response fails to be received by the CC. When a predetermined period of time has elapsed and yet an inquiry order response has not been received, the CC issues an ACK order notifying the common part that the communication will be forced to terminate. In response to the ACK order (forced termination), the common part returns an ACK response (forced termination response) to force the termination of the communication between the CC and the common part for the moment. After that, the CC reissues an inquiry order with the same contents, in response to which the common part returns an inquiry order response (with response data).

Figure 21:
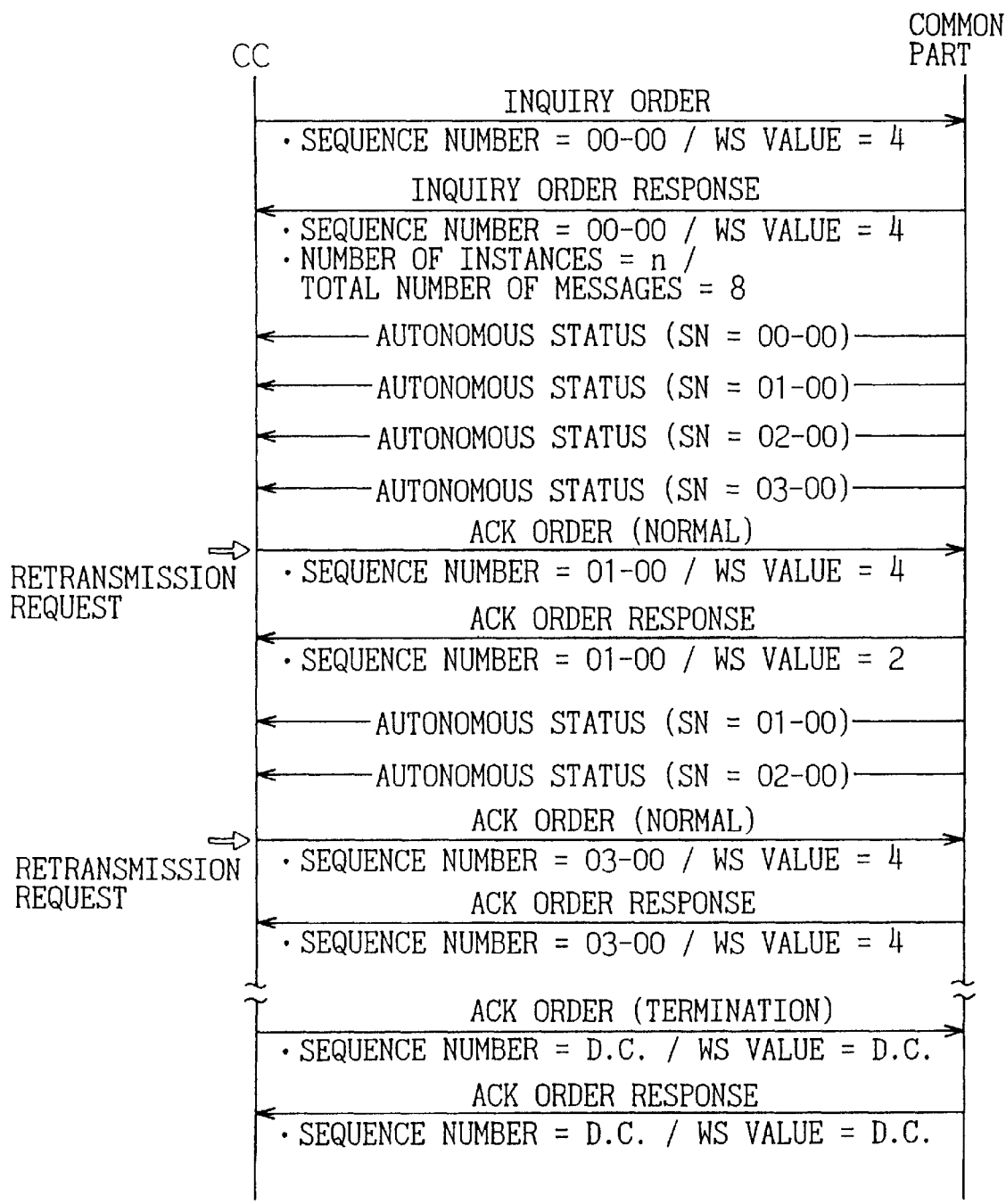
FIG. 21 is a diagram showing a sequence for retransmission of an autonomous status.

FIG. 21 shows a specific example of a communication sequence when autonomous status has not been received correctly by the CC in multiple instance response communication and therefore, retransmission of the autonomous status is performed. The inquiry order is set as follows:
Sequence number=00-00
WS value=4

In response to this inquiry order, if the number of instances for which the common part should return response data is n, the total number of messages is 8, and the WS value is 4, the inquiry order response is set as follows:
Sequence number=00-00
WS value=4
Number of instances=n
Total number of messages=8

This inquiry order response is followed by four autonomous statuses, which are respectively set as follows:
Sequence number=00-00
Sequence number=01-00
Sequence number=02-00
Sequence number=03-00

It is assumed here that, of the four autonomous statuses, the autonomous statuses of sequence numbers 01-00, 02-00, and 03-00 have not been received correctly by the CC. Since all the requested response data have not been received, the CC requests retransmission by returning an ACK order (normal) with 01-00 set as the sequence number from which the next status response is expected. In this case, the ACK order (normal) is set as follows:
Sequence number=01-00
WS value=4

In response to this ACK order, the common part returns an ACK order response which is set as follows:
Sequence number=01-00
WS value=2

This ACK order response is followed by the autonomous statuses of
Sequence number=01-00
Sequence number=02-00

Since the CC has not yet received all the response data, the CC requests retransmission of response data from sequence number 03-00 onward by issuing an ACK order (normal) once again. In this way, a retransmission request and retransmission of response data are repeated until finally the CC issues an ACK order (termination), in response to which the common part returns an ACK order response (termination response) to terminate the communication sequence.

Specific examples of the present invention have been described by taking data (collection in an ATM exchange as an example, but it will be appreciated that the present invention is applicable to a more generalized situation where a first apparatus unit collects a large amount of data from a second apparatus unit holding a large amount of data.

We claim:

1. In a cell switching apparatus comprising a plurality of concentration/distribution units, each connected to a plurality of line interface units, for performing cell multiplexing and demultiplexing, a cell switch, connected to the plurality of concentration/distribution units, for performing cell switching, and a central control unit, connected to the cell switch, for performing path control, a method by which the central control unit collects, from each concentration/distribution unit, data concerning paths set up within the cell switching apparatus, comprising the steps of:

(a) issuing a command, containing specification of multiple data items, from the central control unit to the concentration/distribution unit; and (b) transmitting data of the specified data items to the central control unit in response to the command, wherein the command includes a first window size indicating the amount of data that the central control unit is able to accept at a time, and step (b) includes the substeps of:

(i) transmitting data in an amount not exceeding the first window size to the central control unit;

(ii) transmitting an acknowledge order with the first window size included therein from the central control unit to the concentration/distribution unit if, after substep (i), there remains data yet to be transmitted from the concentration/distribution unit to the central control unit; and (iii) transmitting data in an amount not exceeding the first window size to the central control unit in response to the acknowledge order.

2. A method according to claim 1, further comprising, after step (a) and before step (b), the step of reporting from the concentration/distribution unit to the central control unit a second window size not larger than the first window size and indicating the amount of data that the concentration/distribution unit is able to transmit at a time, and wherein in substeps (b)(i) and (b)(iii), data of an amount not exceeding the second window size is transmitted to the central control unit.

3. A method according to claim 2, wherein the command contains as the specification of multiple data items the specification of all data items from a particular line interface unit.

4. A method according to claim 2, wherein the command contains as the specification of multiple data items the specification of more than one data item from a particular line interface unit.

5. A method according to claim 2, wherein the command contains as the Specification of multiple data items the specification of a particular data item from all the line interface units.

6. A method according to claim 2, wherein the command contains, as the specification of multiple data items, the specification of a particular data item from more than one line interface unit.

7. A method by which a first apparatus unit collects data from a second apparatus unit, comprising the steps of:

(a) transmitting from the first apparatus unit to the second apparatus unit a command containing specification of multiple data items and including a first window size indicating the amount of data that the first apparatus unit is able to accept at a time;

(b) transmitting data of the specified data item in an amount not exceeding the first window size to the first apparatus unit in response to the command;

(c) transmitting an acknowledge order with the first window size included therein from the first apparatus unit to the second apparatus unit if, after step (b), there remains data yet to be transmitted from the second apparatus unit to the first apparatus unit; and (d) transmitting data of the specified data items in an amount not exceeding the first window size to the first apparatus unit in response to the acknowledge order.

8. A method according to claim 7, further comprising, after step (a) and before step (b), the step of reporting from the second apparatus unit to the first apparatus unit a second window size not larger than the first window size and indicating the amount of data that the second apparatus unit is able to transmit at a time, and wherein in steps (b) and (d), data of an amount not exceeding the second window size is transmitted to the first apparatus unit.

* * * * *